(12) United States Patent
Zhang et al.

(10) Patent No.: US 11,292,486 B2
(45) Date of Patent: Apr. 5, 2022

(54) SYSTEM AND APPARATUS FOR A CONNECTED VEHICLE

(71) Applicant: DENSO International America, Inc., Southfield, MI (US)

(72) Inventors: Yu Zhang, Farmington Hills, MI (US); Bilal Alasry, Dearborn, MI (US); Doua Vang, Waterford, MI (US); Te-Ping Kang, Ann Arbor, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 303 days.

(21) Appl. No.: 16/287,473

(22) Filed: Feb. 27, 2019

(65) Prior Publication Data
US 2020/0269864 A1 Aug. 27, 2020

(51) Int. Cl.
*B60W 50/14* (2020.01)
*G05D 1/00* (2006.01)
(Continued)

(52) U.S. Cl.
CPC .......... *B60W 50/14* (2013.01); *G05D 1/0088* (2013.01); *G05D 1/0231* (2013.01);
(Continued)

(58) Field of Classification Search
CPC .............. G08G 1/0129; G08G 1/161; G05D 2201/0213; G05D 2201/0088; G05D 2201/0231; G05D 2201/0257; G05D 2201/0276; B60W 2050/146; B60W 50/14; B60W 2550/00; B60W 2550/40; B60W 2550/402; B60W 2550/406; B60W 50/08; B60W 50/10; B60W 2050/0089; B60W 2050/007; B60W 2050/0072; B60W 2050/0073; B60W 2050/0074; B60W 2050/0077; B60W 2050/0063; B60W 2050/0078; B60W 20/00; B60W 30/10; B60W 30/14; B60W 30/143; B60W 30/18163; G06F 3/00; G01C 21/00; G01C 21/16; G01C 21/30; G01C 21/34;
(Continued)

(56) References Cited

U.S. PATENT DOCUMENTS 9,336,681 B2   5/2016   Annapureddy et al.
9,568,328 B1   2/2017   Abuelsaad et al.
(Continued)

FOREIGN PATENT DOCUMENTS

WO   WO-2010075827 A1 * 7/2010 ......... G01C 21/3415

*Primary Examiner* — Anthony R Jimenez
(74) *Attorney, Agent, or Firm* — Dickinson Wright PLLC

(57) ABSTRACT

A vehicle system in a host vehicle, comprising a vehicle transceiver located in the host vehicle and configured to receive from a remote server a selectable maneuver in response to data indicative of a driving path of one or more remote vehicles identifying one or more hazards. The system may include a processor in communication the vehicle transceiver and programmed to output one or more selectable maneuvers responsive to the data indicative of the driving path of one or more remote vehicles in response to the data indicative of the driving path identifies one or more hazards in a vicinity of the host vehicle, and a display in communication with the processor and configured to display the one or more selectable maneuvers.

19 Claims, 6 Drawing Sheets

(51) Int. Cl.
*G05D 1/02* (2020.01)
*G08G 1/16* (2006.01)
*G08G 1/01* (2006.01)

(52) U.S. Cl.
CPC ......... *G05D 1/0257* (2013.01); *G05D 1/0276* (2013.01); *G08G 1/161* (2013.01); *B60W 2050/146* (2013.01); *G05D 2201/0213* (2013.01); *G08G 1/0129* (2013.01)

(58) Field of Classification Search
CPC .. G01C 21/343; G01C 21/36; G01C 21/3605; G01C 21/3611; G01C 21/3614; G01C 21/3617; G01C 21/3626; G01C 21/3667; G01C 21/3697
USPC .......................................................... 701/27
See application file for complete search history.

(56) References Cited

U.S. PATENT DOCUMENTS

| | | | |
|---|---|---|---|
| 9,760,090 B2* | 9/2017 | Shashua | G06F 16/29 |
| 9,849,882 B2 | 12/2017 | Byun | |
| 9,857,191 B2 | 1/2018 | Mason et al. | |
| 10,451,428 B2* | 10/2019 | Lathrop | G05D 1/02 |
| 2018/0251126 A1 | 9/2018 | Linscott et al. | |
| 2018/0283895 A1 | 10/2018 | Aikin | |

* cited by examiner

SYSTEM AND APPARATUS FOR A CONNECTED VEHICLE

TECHNICAL FIELD

The present disclosure relates to connected vehicles and the various systems that may be utilized on connected vehicles.

BACKGROUND

Vehicles may be equipped with communication tools to send various data to remote servers or to communication various data to other vehicles, either directly or indirectly via the server. As data is collected and shared with such vehicles, various functions may be utilized.

SUMMARY

According to one embodiment, a vehicle system in a host vehicle, comprising a vehicle transceiver located in the host vehicle and configured to receive from a remote server a selectable maneuver in response to data indicative of a driving path of one or more remote vehicles identifying one or more hazards. The system may include a processor in communication with the first sensor and the vehicle transceiver and programmed to output one or more selectable maneuvers responsive to the data indicative of the driving path of one or more remote vehicles in response to the data indicative of the driving path identifies one or more hazards in a vicinity of the host vehicle, and a display in communication with the processor and configured to display the one or more selectable maneuvers.

According to one embodiment, a vehicle system in a host vehicle includes a vehicle transceiver located in the host vehicle and configured to send location data to a remote server and receive from the remote server two more selectable maneuvers responsive to data indicative of a driving path of one or more remote vehicles identifying one or more hazard, and a processor in communication with the vehicle transceiver and programmed to output the two or more selectable maneuvers in response to the one or more hazards in a vicinity of the host vehicle and send instructions to execute one of the selectable maneuvers at the host vehicle.

According to one embodiment, a server comprising a transceiver configured to communicate with one or more remote vehicles and receive data indicative of a driving path of the one or more remote vehicles, a controller in communication with the transceiver and configured to determine one or more hazards utilizing at least the data indicative of the driving path of the one or more remote vehicles, identify two or more vehicle maneuvers in response to the one or more hazards, wherein the two or more vehicle maneuvers are identified utilizing at least the data indicative of the driving path of the one or more remote vehicles, and send information regarding the two or more selectable maneuvers via the transceiver to a host vehicle, wherein the information includes driving instructions for the two or more selectable maneuvers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automated vehicles are becoming more and more common on the roads, therefore, it may be important for these vehicles to rely on an infrastructures of the roadways to keep their trajectory. Current roadways may have imperfections. Such imperfections may be conditions such as missing lane markers, pot holes, or temporary construction sites, as an example. Even if the road infrastructure is correctly laced, it may not ensure the best practice (e.g. if a driver stops at a stop line it does not provide enough vision to detect cross traffic). On the other hand, with connected technology (such as V2X), it is possible for vehicles to connect with one another and form a "solution space" from which the user could advise the Autonomous Drive (AD) vehicle to follow. The AD system could learn from operators' choices and provide a smoother driving experience for the driver. There is a need, therefore, for such a system so that automated vehicles will be able to present the safest and most logical path to a destination. Further, once this path is presented to a driver, he/she may select this viable path solution with confidence. This path will be based on pattern detection through crowd sourcing, vehicle intelligence such as monitoring and feedback capabilities, and vehicle verification of solutions.

The embodiment discussed below may utilize various anonymous and collaborative information from connected vehicles (e.g. path and shock, slippery information at a specific road section) to form a "solution space" for automated vehicle operators to choose from. Automated vehicles may adjust a path and maneuvering speed based on the traffic around the vehicle, as well as the presence of various events, such as hazardous situations, safe maneuvering, traffic due to construction, unusual driving patterns, etc.

Figure 1:
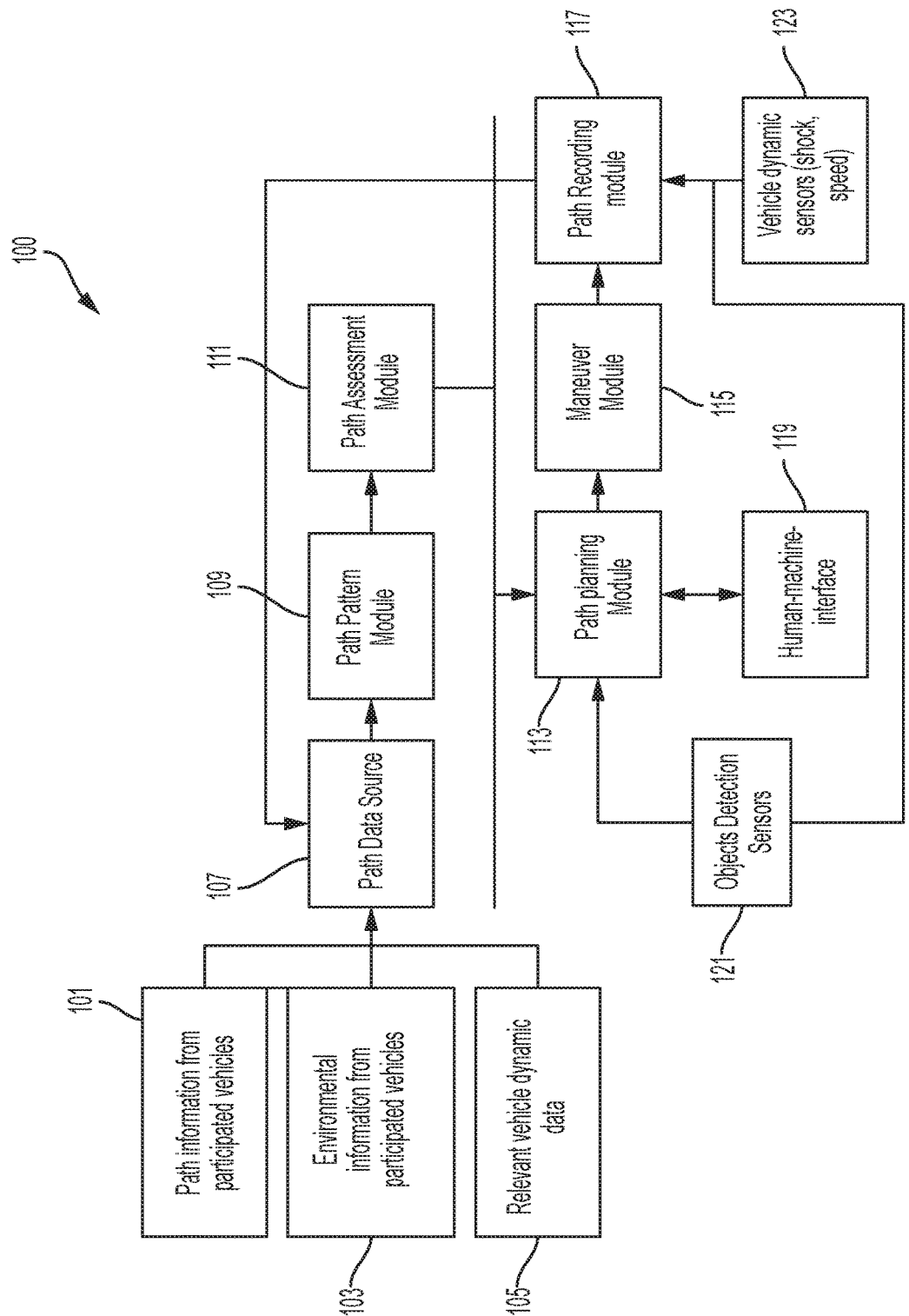
FIG. 1 discloses a system diagram of a vehicle system 100 according to one embodiment.

FIG. 1 illustrates a system 100 for implementing an autonomous driving system configured to generate a driving plan for an autonomous vehicle. The system 100 may include an autonomous vehicle and a remote server. The vehicle may wirelessly communicate with the remote server via one or more networks, such as one or more of the Internet, a local area network, a wide area network, and a cellular network.

The vehicle may include a controller. The controller may be a vehicle controller, such as an electronic control unit ("ECU"). The controller may be configured to implement the planning-based approach and/or the learning-based approach described herein. In other words, the controller may be configured to plan the operation of other vehicles traveling proximate the vehicle, and to control the vehicle based thereon.

The system may utilize a communication module to exchange (e.g. send and receive) data from other vehicles. The vehicle may receive path information data 101, relevant environmental information 102, vehicle dynamic information of other vehicle 103 via the communication module.

The controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information.

The processor may be configured to read into memory and execute computer-executable instructions embodying one or more software programs, such as a path planning module 113, residing in the non-volatile storage. The path planning module 113 may be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the path planning module 113 may be configured, upon execution by the processor to cause the controller to implement the path planning module 113, and correspondingly to implement functions, features, and processes of the path planning module 113 described herein.

The non-volatile storage may also include data utilized by the controller, or more particularly by the path planning module 113, when implementing the functions, features, and processes of the controller described herein. For example, the non-volatile storage may include cost function data, trained behavior model data, goal data, object model data, and map data, each of which may enable the path planning module 113 to predict behaviors of other objects proximate the vehicle. The cost function data may define one or more cost functions, each which may map a candidate trajectory for a proximate object to a cost value to the object for taking the trajectory. The trained behavior model data may define one or more trained behavior models, each which may be configured to predict the future behavior of a given proximate object based on a data set of previously observed object behaviors and current observations of the proximate object. The goal data may define goals for various objects given a particular travel context (e.g., highway road, city road, object class such as passenger vehicle, motorcycle, semi-truck, bicycle, pedestrian, or non-moving object in the road). The object model data may define one or more object models, which may set forth the dynamics for various object classes. The map data may define travel infrastructure details by location.

The non-volatile storage may also include one or more database structures for collecting, organizing, and enabling fast retrieval of the data stored therein. For example, the stored data may be arranged in one or more relational databases, one or more hierarchical databases, one or more network databases, or combinations thereof. A database management system in the form of computer software executing as instructions on the processor may be used to access the information or data records of the databases in response to a query, which may be dynamically determined and executed by the path planning module 113.

The controller may communicate with other components of the vehicle, such as a communications module, various proximity sensors 121, a navigation system, a braking system steering system, and an engine system. The controller may be directly connected to one or more of these other components, such as via various input/output (I/O) ports of the controller. Additionally, or alternatively, the controller may communicate with one or more of these other components over one or more in-vehicle networks, such as a vehicle controller area network (CAN), an Ethernet network, a media oriented system transfer (MOST) network, and a wireless local area network (WLAN).

The communications module may be configured to facilitate wireless communication between the vehicle components and other devices and systems external to the vehicle, such as the remote server, using radio frequency (RF) transmissions. For example, the communications module may include a cellular modem or other wireless network transceiver (e.g., Wi-Fi transceiver) configured to communicate with the remote server over one or more networks, such as one or more of the Internet, a local area network, a wide area network, and a cellular network to which the cellular modem is subscribed. The controller may communicate with the remote server by accessing the communication capabilities of the communications module.

The communications module may also include one or more wireless transceivers configured to facilitate direct wireless communication with other devices and systems, such as a personal computer device or key fob, when such other devices and systems are local to (e.g., within direct wireless communication range of) the vehicle. To facilitate such local wireless communications, the communications module may include a Bluetooth transceiver, a ZigBee transceiver, a Wi-Fi transceiver, a radio-frequency identification ("RFID") transceiver, a near-field communication ("NFC") transceiver, a vehicle-to-vehicle (V2V) transceiver, a vehicle-to-infrastructure (V2I) transceiver, and/or transceivers designed for other RF protocols particular to remote services provided by the vehicle (e.g., keyless entry, remote start, passive entry passive start).

The system 100 may include collection of path information 101 from participating vehicles. The participating vehicles may be V2X vehicles that are collecting lane path information to crowd source for assessment. The path information 101 may include probe data or bread crumbs of their location or coordinates. As those vehicles travel, the vehicles may send probe data of their locations to an off-board server to be utilized for assessment and mitigating hazardous information. The path information 101 may be collected from any type of vehicle that can communicate location data of the path that they travel on through time with a remote server.

The system 100 may also include collection of relevant environmental information 103 from participating vehicles. The environmental information 103 may be information that is collected or generated from vehicle cameras, Lidar sensors, or other sensors that can collect information outside of the host vehicle. For example, a vehicle may be equipped with a camera that monitors the outside of the vehicle. The vehicle's camera may identify that the coordinates include a stop sign, an emergency vehicle located nearby, or that there is low visibility (e.g. due to fog or smog). The data identified such characteristics may be collected and sent to a remote server via transceiver. Additionally, other external objects may be detected via the camera and shared with the remote server. As discussed further below, the environmental information 103 may be utilized in the path assessment module 111 to assess why drivers are taking the path suggested.

The system 100 may gather and collect relevant vehicle dynamic data 105. The vehicle dynamic data 105 may include data related to vehicle dynamics, such as speed, suspension (e.g. vibration data and/or movement data), acceleration, deceleration (e.g. hard braking), etc. The path information 101, environmental information 103, and the vehicle dynamic data 105 may be generated by remote vehicles and sent to an off-board server or the "cloud" for computing to identify different path patterns, hazards and other situations that may required user feedback when operating a vehicle (either autonomous, semi-autonomous, etc.).

Path data source 107 may include various vehicles that are collecting probe data or bread crumbs of their location or coordinates, their relevant environmental information and their vehicle dynamics. The path data source 107 may include a database located at a remote server that includes raw probe data that includes location information or bread crumb information. The remote server or a vehicle may utilize the data to identify patterns and determine what the patterns may mean utilizing the raw probe data, as discussed below. The path data source 107 may include other information regarding vehicle dynamics at the various coordinates, as well as external environmental information at the various coordinates. As shown in FIG. 1, the system 100 may aggregate the path information 101, environmental information 103, and vehicle dynamic data 105 to one path data source 107 that may be an off-board server that communicates to various vehicles.

The system may include a path pattern module 109 that is utilized to identify various patterns in the path data. The path pattern module 109 may be configured to evaluate the path data to identify reoccurring patterns in data stored at the path data source 107. For example, 1,000 vehicles may driver around a specific intersection. The system may process the data to identify and compare all of the data collected from the vehicles to identify one or more patterns. For example, various vehicles may have similar driving patterns over each area. Of the sample size (e.g. 1,000 vehicles) there may be several different patterns that are identified. Any outliers may be ignored if there is no commonality as to the driving patterns of several vehicles.

Path assessment module 111 may utilize the data from the path data source 107 and the patterns identified by the path pattern module 109 to assess a situation or hazard at the location utilizing the data. For example, the system may identify from various patterns that a pothole exists. Such patterns may include vehicles swerving around a certain location. Another pattern may include vehicles going over a certain location at a reduced speed and the vehicle feeling an impact of the pothole (e.g. sensors in the vehicle collect shock data or impact data of the encounter with the pot hole.)

The path planning module 113 may identify the set path that a vehicle may take. Thus, the path planning module 113 may be in communication with various modules that control where the vehicle is set to travel. Such modules may include the navigation system, map database, ADAS database, etc. The path planning module may be located on a remote server or at the vehicle to help guide a vehicle.

The maneuver module 115 may identify the various maneuvers a vehicle may be presented to take and executing the maneuver. Thus, the vehicle maneuver module 115 may be in communication with various modules that control how the vehicle operates (e.g. steering, acceleration, etc.) to execute how a vehicle may operate. Thus, various signals and instructions may be sent from the maneuver module 115.

The path recording module 117 may be located on the host vehicle and record all relevant data that may be shared with an off-board data. For example, the path recording module may record the breadcrumb/path pattern information, vehicle dynamic data, and vehicle environment information. The path recording module 117 may collect all the path information to save and store off-board at a server.

The objection detection sensors 121 or proximity sensors 121 may be configured to detect objects proximate to the vehicle, and to correspondingly generate proximity data indicative of the current operating state of such objects. For example, the proximity sensors 121 may be configured to detect the existence of other vehicles, lane lines, guard rails, objects in the roadway, buildings, and pedestrians within a particular distance of the vehicle. The proximity sensors 121 may be configured to communicate the generated proximity data to the to the controller, which may be configured to interpret the proximity data to derive the operating state of each detected proximate object. For example, the controller may be configured to identify a pose for each proximate object, which may indicate the position and orientation of each object relative to the vehicle (e.g., angle and distance). The controller may also be configured to identify movement information for each proximate object (e.g., speed, velocity, acceleration), and a class for each proximate object (e.g., passenger vehicle, truck, motorcycle, pedestrian, bicycle). The controller may then be configured to utilize the operating state of each proximate object to plan an operation for the object, such as slowing down or switching lanes, and to control operation of the vehicle based on the planned operation.

As an example, the proximity sensors 121 may include one or more LIDAR sensors. The LIDAR sensors may each be configured to measure a distance to an object external and proximate to the vehicle by illuminating the target with a pulsed laser light and measuring the reflected pulses with a sensor. The LIDAR sensors may then measure the differences in laser return times and, based on these measured differences and the received wavelengths, may generate a digital 3-D representation of the object. The LIDAR sensors may further have the ability to classify various objects based on the 3-D rendering of the object. For example, by determining a shape of the target, the LIDAR sensors may classify the object as a passenger vehicle, motorcycle, truck, curb, roadblock, building, pedestrian, and so on. The LIDAR sensors may work in conjunction with other vehicle components, such as the controller and other proximity sensors 121, to classify various objects outside of the vehicle. The LIDAR sensors may include laser emitters, laser receivers, and any other suitable LIDAR autonomous vehicle sensor components. The LIDAR sensors may further be arranged within a housing configured to rotate to facilitate scanning of the environment.

As another example, the proximity sensors 121 may include one or more cameras for capturing images of the environment surrounding the vehicle. For example, the proximity sensors 121 may include a forward-facing camera that is mounted to the rear-view mirror of the vehicle and is configured to collect image data of the environment in front of the vehicle. Similarly, the proximity sensors 121 may include a rear-facing camera that is mounted to the trunk of the vehicle and is configured to collect image data of the environment behind the vehicle, and may include side-facing cameras that are mounted to the side view mirrors of the vehicle and are configured to collected image data of the environment to each side of the vehicle. The controller may be configured to process the image data captured by the one or more cameras of the vehicle to identify conditions around the vehicle, including, for example, the position of lane markers, the existence of traffic symbols, and the existence and operating state of other objects proximate the vehicle. The controller may be configured to identify such conditions by comparing the location and color of pixels within the image data to prestored templates associated with various conditions.

As additional examples, the proximity sensors 121 may include one or more radar sensors, one or more ultrasonic sensors, and/or any other sensors for detecting information about the surroundings of the vehicle. The sensors may be mounted anywhere on the vehicle. For example, a proximity sensor 121 may be mounted on a roof of the vehicle so as to have a three hundred sixty-degree view of the environment surrounding of the vehicle. Additionally, or alternatively, various proximity sensors 121 may surround the vehicle to provide a three hundred sixty-degree view of the vehicle. The vehicle may include actuators for adjusting an angle of the field of view of the various proximity sensors 121.

The system 117 may include a navigation system may be configured to generate geographic data for the vehicle, such as via communicating with one or more satellites orbiting Earth. The geographic data may indicate a current geographic location of the vehicle, such as by including current longitude and latitude coordinates of the vehicle. As some non-limiting examples, the navigation system may include one or more of a Global Positioning System (GPS) module, a Quazi-Zenith Satellite System (QZSS) module, a Russian Global Navigation Satellite System (GLONASS) module, a Galileo System (GSNN) module, an Indian Regional Navigation Satellite System (IRNSS) module, and an inertial navigation system (INS) module.

The navigation system may communicate the geographic data to the controller, which may be configured to utilize the geographic data to determine the geographic location of the vehicle, and to correspondingly determine the geographic location of detected proximate objects. The vehicle may also include a gyroscope or compass configured to indicate a current heading of the vehicle, which the controller may combine with the geographic data to produce data indicating the current location and heading of the vehicle. Alternatively, the controller may determine the heading of the vehicle based on received geographic data indicating a changed position of the vehicle over a short time span (e.g., one second), which suggests that the vehicle is moving in a direction corresponding to the change in position.

The controller may be configured to query the map data based on the geographic data to identify information about the travel infrastructure currently in use by the vehicle. In particular, the map data may include detailed information about travel infrastructure in various geographic locations, such as road type (e.g., highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, as some non-limiting examples. Alternatively, the controller may be configured to derive at least some of this information from proximity data generated by the proximity sensors 121, such as via processing image data captured by cameras of the vehicle.

Responsive to receiving the geographic data from navigation system, the proximity data from the proximity sensors 121, and the map data corresponding to the received geographic data, the controller of 117 may also identify the position of each detected proximate object within the currently used travel infrastructure, which may also be part of the determined operating state for each object. Specifically, the controller may be configured to determine the location of the vehicle within travel infrastructure based on the geographic data, the map data, and/or the received proximity data, including which lane of the travel infrastructure the vehicle is currently located. The controller may then be configured to identify the location of each detected proximate object within the currently used travel infrastructure based on the relative position of each proximate object, as indicated in the proximity data, and the map data. For example, if the detailed lane information included in the map data, or the proximity data, indicates that a particular lane is located a given distance away from the current position of the vehicle, and the proximity data indicates that a detected proximate object is located alongside the vehicle at a distance from the vehicle equal to the given distance, then the controller may be configured to determine that the proximate vehicle is traveling in the given lane.

The braking system, steering system, and engine system may control movement of the vehicle, such as at the direction of the controller. In particular, the controller may be configured to plan an operation for each detected proximate object based on the determined operating state for each object, and may then be configured to generate a driving plan for the vehicle that avoids a collision with any of the detected proximate objects assuming they act according to the planned operations. Thereafter, the controller may be configured to cause the vehicle to operate according to the driving plan by transmitting corresponding control signals to the braking system, the steering system, and the engine system. For example, the controller may transmit a control signal to the braking system to slow down or stop the vehicle, may transmit a control signal to the steering system to turn or adjust a heading of the vehicle, and may transmit a control signal to the engine system to speed up the vehicle to a specified velocity, to maintain a specified velocity, and to shift gears, in accordance with the driving plan.

The remote server may similar include a processor, memory, and non-volatile storage including data and software that, upon execution by the processor of the remote server, causes the remote server to perform the functions, features, and processes of the remote server discussed herein. The remote server may have access to one or more autonomous databases, which may be maintained in the non-volatile storage of the remote server or in an external persistent storage device accessible by the remote server, such as a network drive. The autonomous databases may include up-to-date versions of the data stored in the non-volatile storage of the controller, such as the cost function data, map data, and so on. Periodically, the controller may be configured to query the remote server via the communications module to determine if its data is up to date. If not, the remote server may be configured to transmit the up-to-date data to the vehicle for inclusion in the non-volatile storage. Alternatively, responsive to an update to the autonomous databases that is relevant to the vehicle, the remote server may be configured to transmit the updated data to the vehicle. The remote server may aggregate the path data source 107 and host the path pattern module 109 and the path assessment module 111. Thus, the remote server may aggregate and process the necessary data to identify driving patterns from multiple vehicles to present maneuvering options when an upcoming hazard or situation is immediate to a host vehicle.

The system may adjust a path and maneuvering speed based on the traffic around the vehicle utilizing the lane path for certain situations. One situation may include a hazardous driving situation. Such hazardous situations may include a pot hole on the road, black ice, a loose item on the road, etc. The vehicle may use direction mitigation and speed control to continue the "best" path. Such possible options may be displayed on the HMI 119 (e.g. human machine interface 119). For example, there may be three patterns to approaching a pot hole, a global optimization, a solution bounded by lane markings, and solution bounded by one lane marking. The global optimization may be calculated as a closest no-impact path to the hazard regardless of lane markings (the driver can customize the acceptable safety margin). The solution bounded by lane markings is calculated by understanding the impact and speed profile and choosing a reasonable speed to continue within lane markings (the driver can customize acceptable shock, slippery level). The solution bounded by one lane marking is calculated by understanding the impact and speed profile and choosing a reasonable speed to continue along one lane marking (the driver can customize acceptable shock, slippery level, and preferred speed advantage). Other considerations may be utilized such as a user defined safety margin, larger margin, and the possibility of the vehicle going over the shoulder. A vehicle may need to adjust a path and maneuvering speed based on traffic due to construction. The path data may identify that there is traffic due to construction. The vehicle may utilize the path data to determine the open lanes and figure out what speed to travel at. Thus, the lane path information can be utilized to figure out what lanes are open and closed by utilizing the historical data.

Figure 2:
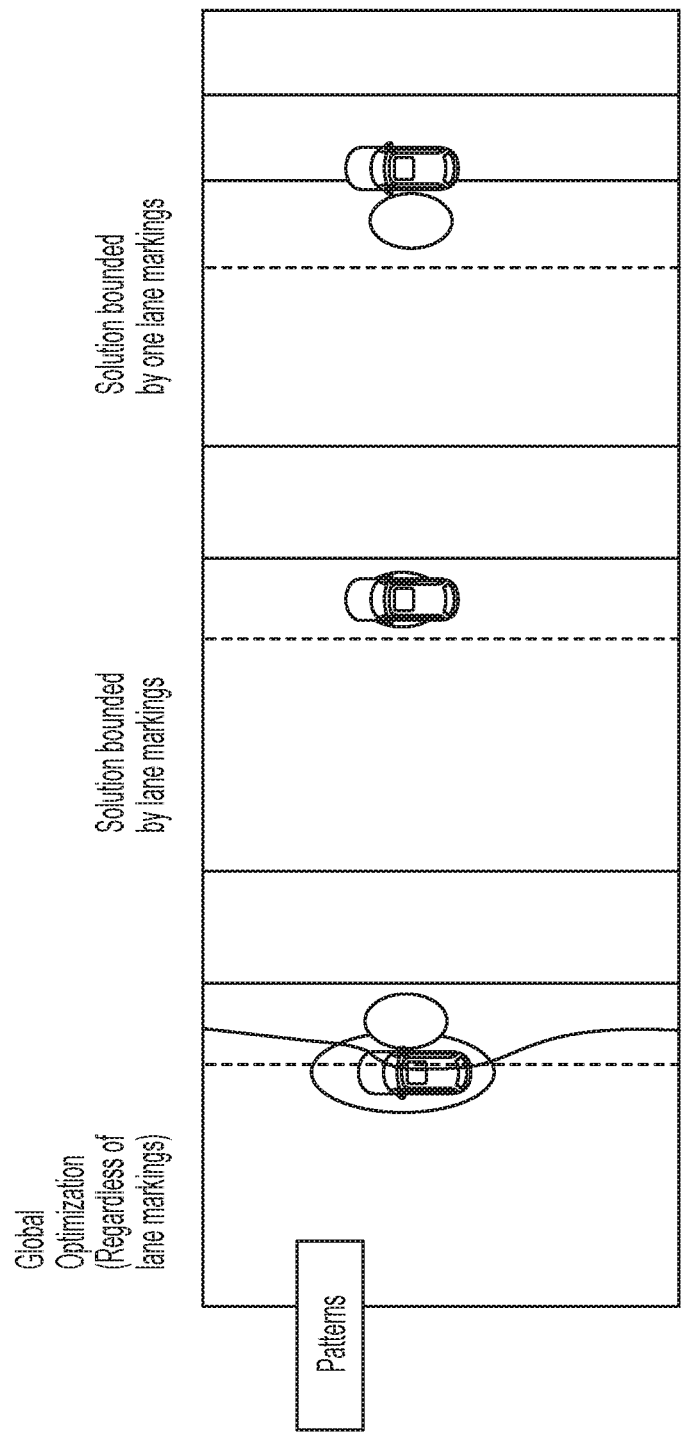
FIG. 2 discloses an example overview of a scenario for driving pattern options FIG. 3 discloses an overview diagram of an embodiment of two speed patterns at an intersection.

FIG. 2 is an illustration exemplifying how hazardous situations may play out with options displayed on an HMI. A vehicle may be aimed at addressing how a pot hole on a road can be handled. A first situation may allow the system to calculate avoiding the pot hole. As shown, in FIG. 2, the vehicle may have a pattern of driving that avoids the pothole and crosses a lane-marking that can be passed. Such a scenario may be calculated as the closets no-impact path to the hazard. A driver may customize the acceptable safety margin.

Another solution may be bounded by the lane markings and require the vehicle to travel over the pothole. The system may calculate such a situation by understanding the impact and speed profile of the vehicle. The system may attempt to utilize a reasonable speed that the driver can assume is an acceptable level of shock against the vehicle.

Another situation may have a solution that may be bounded by one lane marking. The vehicle may avoid the pothole, however, it may cross the road shoulder onto the side of the road. The system may calculate such a situation by understanding the impact and speed of various vehicles that travel near the pothole, and choosing a reasonable speed that the driver finds as an acceptable shock, slippery level, and preferred speed advantage.

In other embodiments, the system may calculate a solution by utilizing other criteria. Such criteria can include a user defined safety margin, such as setting an acceptable distance to keep from a pothole and other vehicles. The system may allow for larger margins that will push the car to take more impact, but the car may reduce speed to minimize the impact upon hitting the pothole.

Figure 3:
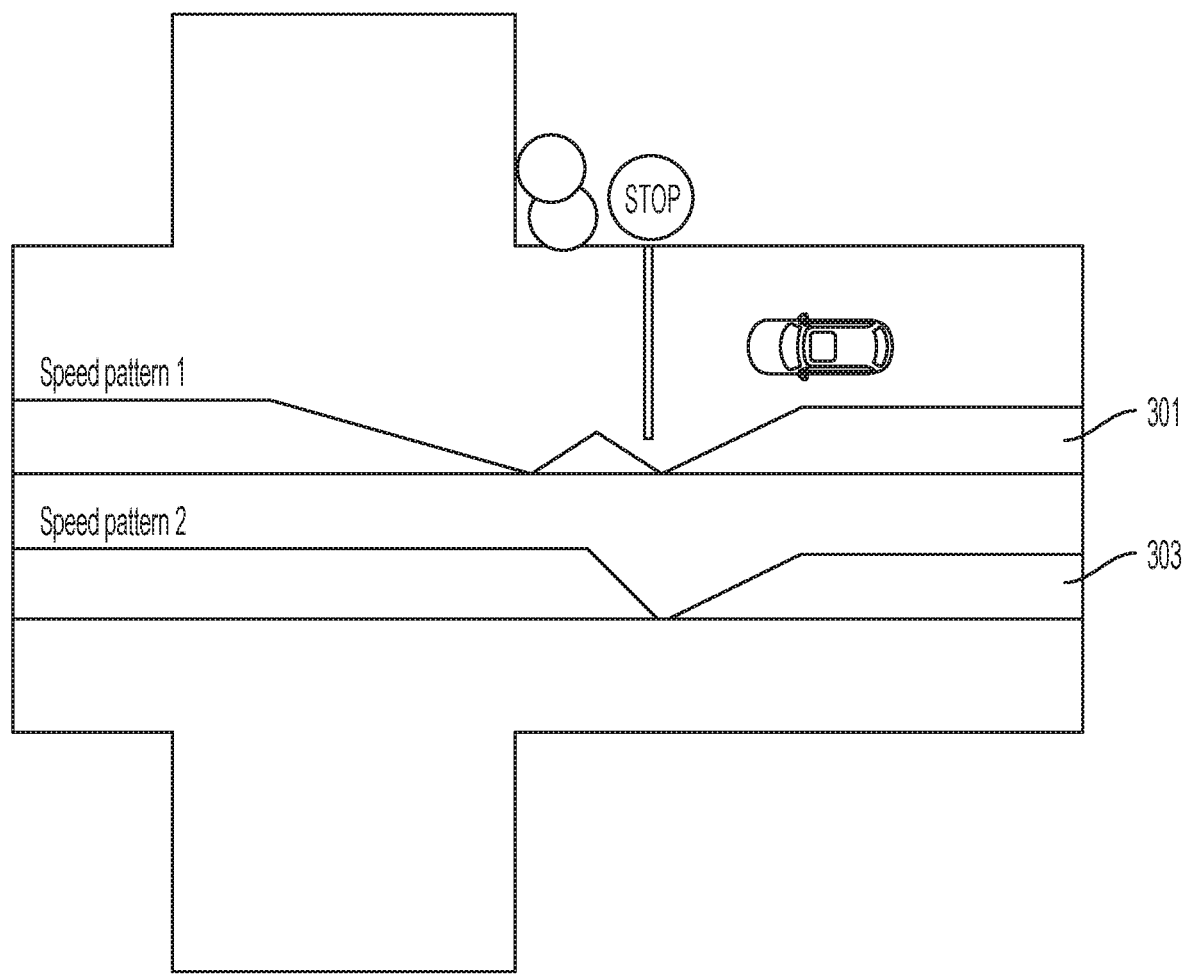

FIG. 3 is an illustration of a speed pattern graphed at an intersection with a stop light. FIG. 3 shows how two different vehicles may approach a stop sign at an intersection when compared to a vehicle speed. In one speed pattern 301, the vehicle may decrease to a stop near a stop sign. The vehicle may increase and then decrease at an intersection. In another example, the second speed pattern 303 may decrease to a stop at the stop sign. The vehicle may simply just increase its speed following the stop sign and be consistent. The system may utilize the speed patterns to compare to identify common themes. For example, comparing the first and second speed pattern 301, 303 may identify the stop sign given that both vehicles both decelerated near the same point of the intersection.

Figure 4:
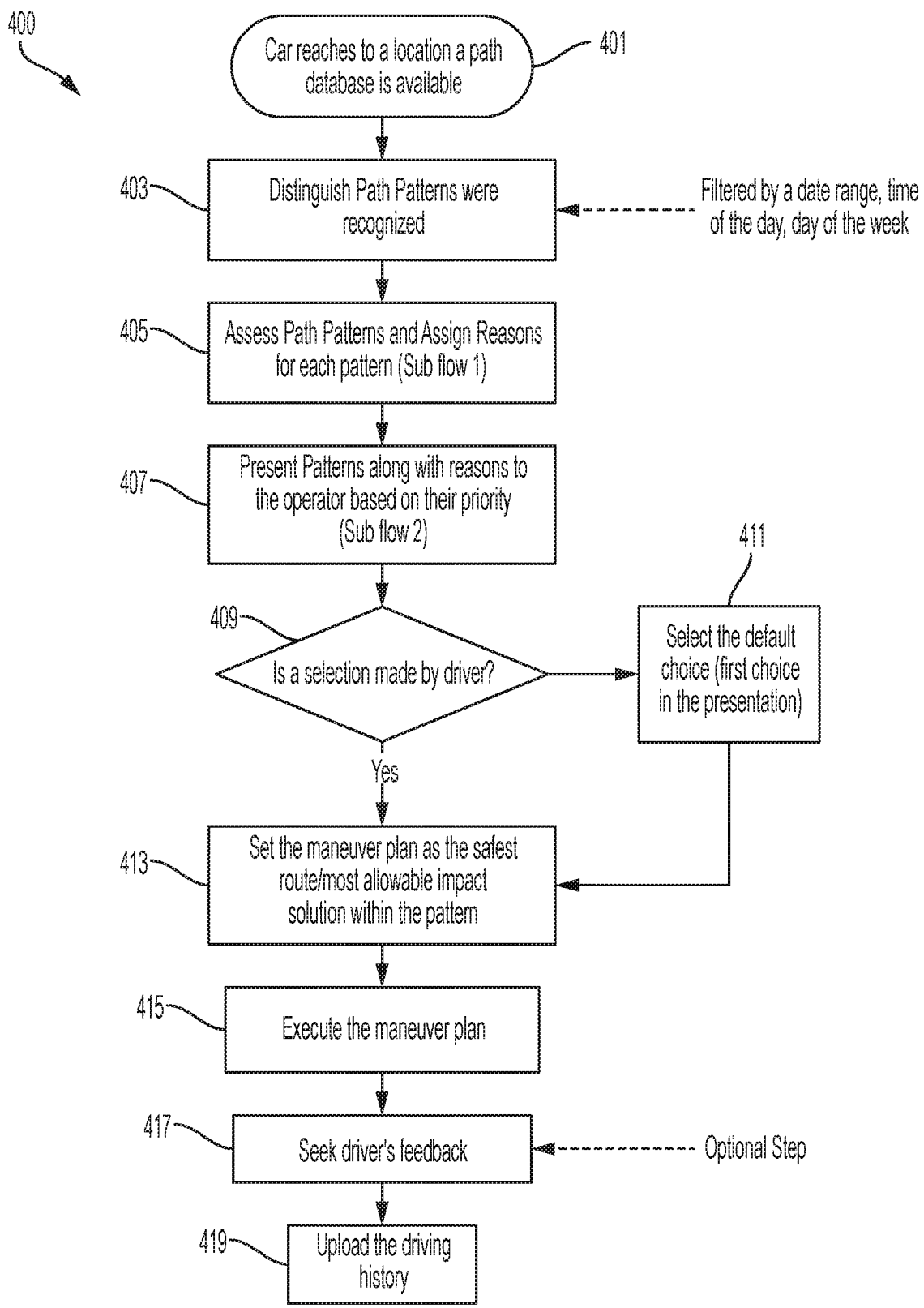
FIG. 4 discloses an example flow chart 400 of a vehicle system identifying a path pattern near a host vehicle location.

FIG. 4 is a flow chart that display how the system may assess path patterns with a solution space. At step 401, the system may reach a location with a path database available. The vehicle may be in communication with a remote server that includes path data or driving pattern data related to a route that the host vehicle is driving or will be driving. The remote server may have information related to the route, including the path data and driving pattern data. The system may be able to view historic path data of other vehicles by retrieving the data from the system. The database may flag a location or area that is defined with containing enough path information to utilize the data.

At step 403, the system may distinguish path patterns that were recognized. Thus, the system may filter through the path database and filter information by data range, time of the day, day of the week, etc. The system may analyze the path patterns to see which reoccurring patterns have existed. The path patterns may also differ from each other by adopted paths (path clutters that distinguished from each other), vehicle dynamic profile (e.g., speed profile clutters that distinguished from each other, see FIG. 3), or combination of both path and vehicle dynamic profile (see FIG. 2).

Figure 5:
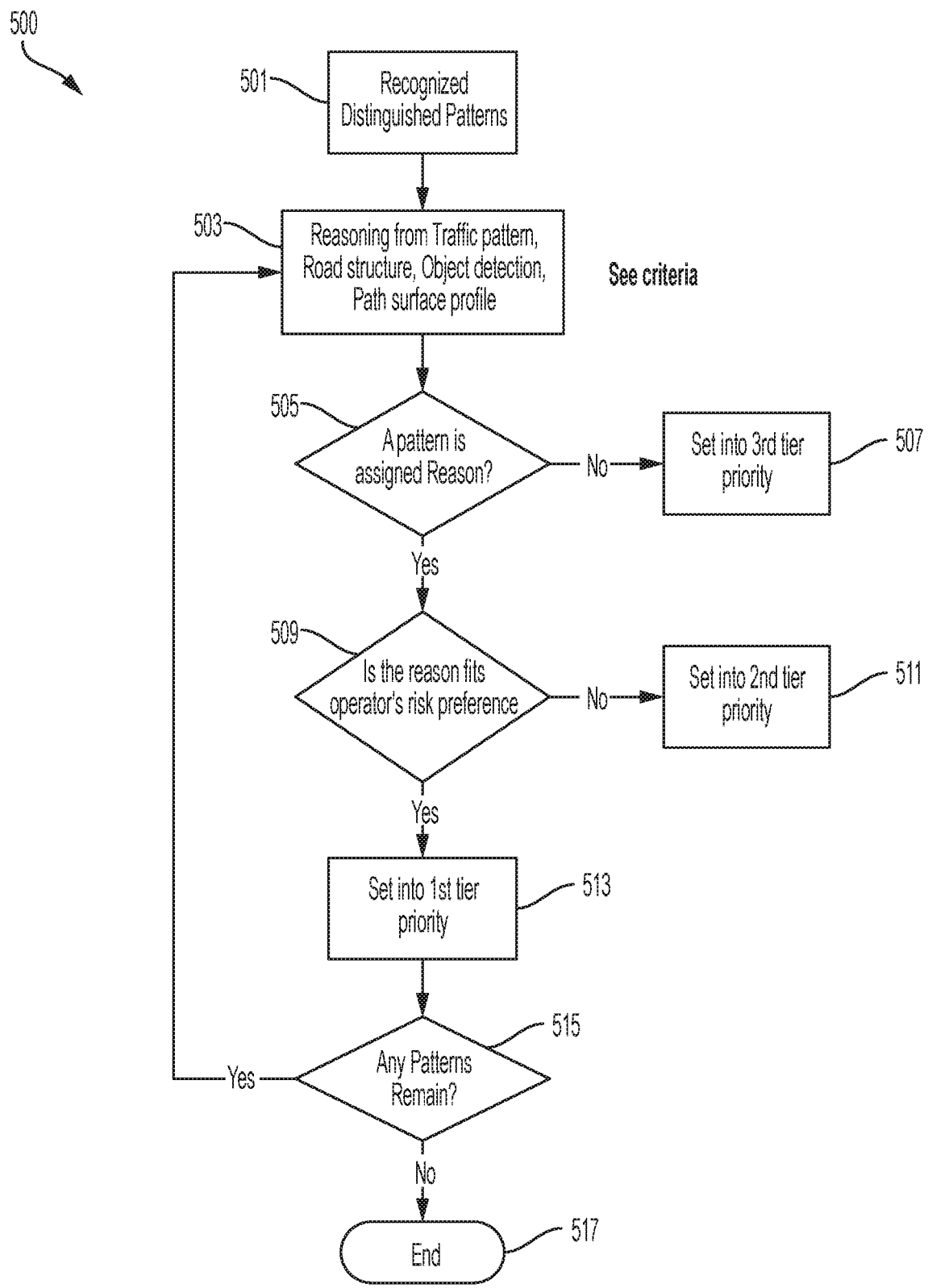
FIG. 5 discloses an example flow chart for assessing a traffic pattern.

At step 405, the system may assess the path patterns and assign reasons for each pattern. At a high-level, the system may analyze the pattern to determine if the path pattern is based on traffic patterns, road structures, objection detection results, or path surface profiles, etc. For example, in the example illustrated by FIG. 3, the speed pattern 301 may resulted from a significant proportion of driver thought the second stop right before the intersection would enhance the visibility of vehicle traveled from other direction. The systems understand the first slowdown was due to the stop sign (a roadway infrastructure) and the second slowdown as due to the intersection (a roadway structure). Therefore, the system may name the pattern 301 as "cautionary solution with enhanced visibility" and name pattern 302 as "solution based on traffic sign". FIG. 5 may exemplify in greater detail how each pattern is assigned a reason and how system handles patterns that cannot be assigned a reason based on available information.

Figure 6:
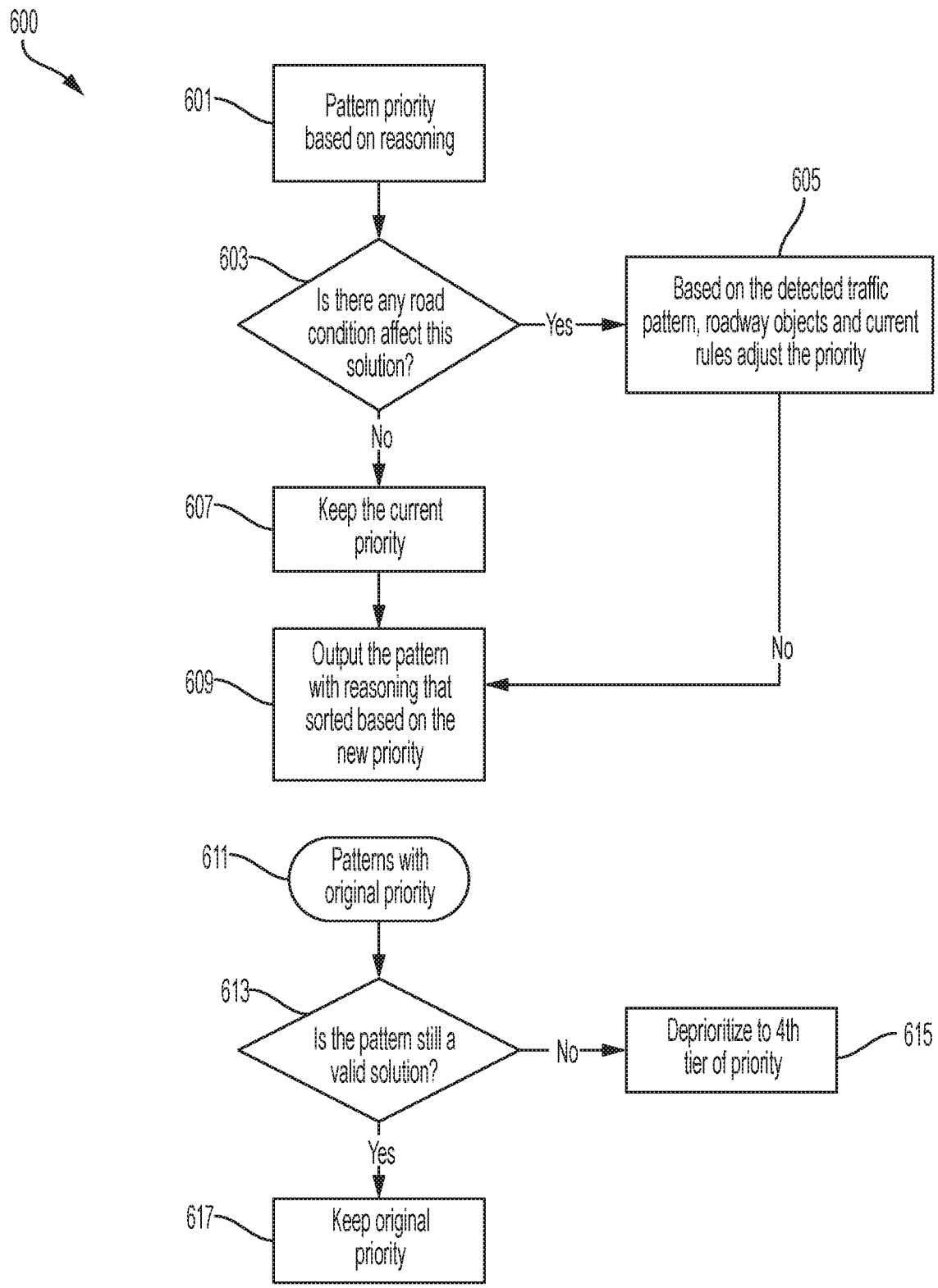
FIG. 6 discloses an example flow chart 600 for prioritizing a maneuver.

At step 407, the system may present patterns of the path, along with the assignment reasons to an operator. At a high-level, the system may output the suggested pattern and reasoning for the pattern to the operator on a display or another interface of the vehicle. FIG. 6 may exemplify in detail how the priority is determined to present the pattern and reasoning. In one example, the system may present to a driver how an upcoming pothole is treated. Referring back to FIG. 2, the system may present the user with an option to avoid the pothole by changing lanes, drive over the pothole with a low speed, or avoid the pothole by traveling passed the shoulder of the road.

At decision 409, the system may determine if a selection is presented to the driver. A driver may select a maneuver to execute utilizing a user interface with touch screen graphical images or via a voice recognition system. At step 411, if the driver does not decide a selectable maneuver, the system may select a default choice. The default choice may be a setting based on the prior preference of a driver or a factory setting. The system may select the default choice when a threshold time has expired. The default choice may be selected based on what the system views as the most popular. For example, the system may analyze user inputs or driving patterns from all the relevant data points to determine the most popular maneuver. The most popular maneuver may be selected as that data point. In another option, the system may analyze all of the selectable maneuvers and set a default maneuver based upon driver's previous maneuvers. For example, if a driver typically driver's over a pothole at a low speed versus driving around it, the system may set the default choice as driving over the pothole at a low speed.

At step 413, the system may set the maneuver plan as the safest route and most allowable impact solution within the pattern. For example, in the example illustrated by FIG. 2, if the driver select maneuvering around the pothole regardless of lane markings, the safest path may be the one closet to the edge of the pothole, while modulating vehicle speed based on the surrounding traffic. Thus, the system may record the maneuver's selected by the driver to learn behaviors or preferred maneuvers. The system may learn speeds that that driver prefers to drive in certain situations or certain hazards to avoid completely. As the system learns the preferences, it may upload them to a server to adapt such patterns to other hazards or situations.

At step 415, the system may execute the maneuver plan. The system may send instructions to the relevant vehicle controller to execute the necessary maneuver's to operate the vehicle according to the maneuver selected by a user (or the default choice). For example, the system may need to send instructions to multiple vehicle controllers in order to execute the proper command. For example, if the user selects an option to driver over a pothole, but slow down the vehicle, the system may send an instruction to a vehicle speed or throttle controller to reduce the vehicle speed. In another example, if the user selects an option to drive around the pothole, the system may send instructions to a steering wheel controller to veer left or right at a certain angle in order to avoid driving over the pothole, and then to veer left or right again after passing the pothole to return to the lane that the pot hole was in.

At step 417, the system may seek driver's feedback regarding the solution or maneuver to the hazard that the vehicle system assisted in taking on. The feedback may be optional to the system. The system may request feedback of the maneuvering that is utilized by the vehicle. For example, the system may output on an interface feedback regarding vehicle smoothness of a lane-change, vehicle speed going over a pothole, vehicle speed driving over a shoulder of a road, etc. An off-board server may utilize the feedback from the user to decide whether or not to select a maneuver as a default choice. The off-board server may send the feedback in the form of a score to assess the user with scoring for comfort or safety of the maneuver.

At step 419, the system may upload the driving history to a remote server. The system may send all the relevant data collected along the driving path to a remote server. Such data may include the relevant vehicle dynamic data, the driving path data, and the relevant vehicle environment data. Such data would be used as feedback to the crowd sourcing database 107, as well as be used to record driver's preference of solution and calculate allowable impact.

FIG. 5 is a flow chart that may be utilized to detail how an assessment of a situation is handled by the vehicle system. At step 501, the system may have a recognized pattern that is found based on the historic path data that is collected, along with other crowd-sourced data such as speed information and other vehicle dynamics. The system may compare all the pattern data of the all of the vehicles to assess similarities between various driving patterns. The data may compare location information/data of the vehicles (e.g. driving path), fluctuations in vehicle speed, fluctuations in vehicle acceleration/deceleration, suspension data (e.g. vehicle vibration data), and other vehicle dynamic data.

At step 503, the system may utilize reasoning from a traffic pattern, road structure, object detection, path surface profile, etc. For example, the system may analyze a traffic pattern to see if there is any commonality in order to analyze the data to suggest maneuvering. The reasoning may break down data for common hazards or maneuvering situations from a vehicle. For example, the system may look to see if the solution has safety consequences (e.g. hard braking). The system may look to see if a solution involves any violations of breaking defined "rules" set by the system or local laws/ordinances.

At decision 505, the system may determine if the pattern is assigned a reason. The system may compare the pattern to various templates that are formed or created to identify certain driving situations. The system will utilize the comparison to determine if a situation arises from the collected information. If not, the system may set the pattern into a $3^{rd}$ tier priority at step 507. Thus, the $3^{rd}$ tier of priority may equate to the system not having sufficient data to identify a rationale that explain why participating drivers choose that pattern. If the system does determine that the pattern may have an assigned reason (e.g. going around a pothole, going through a pothole due to lane boundary constrains, going around the pothole via taking the shoulder) the system may progress further to further assess the pattern.

At decision 509, the system may analyze the vehicle settings to determine if the assigned reason fits the operators risk preference. The user may have set default settings to determine whether or not the vehicle should send feedback to the user for certain driving situations (e.g. pothole or other hazard). Certain settings that a user has set may request that the system ignore feedback from the system and instead proceed to driver normally, while other hazards may have been set to request feedback to the user to select a preferred maneuver. If a certain hazard has been assessed to not fit the operator's risk preference (e.g. operator respects lane markings in general), the system set the situation into a second tier of priority if the reason does not fit in the operator's risk preference at step 511. For example, the system may identify a situation of a pothole present, and the operator has generally selected to respect lane markings and go through the pothole with lower speed. The system may simply assign other patterns that go around the pothole at the cost of crossing lane as a second tier of priority. At step 513, the system will set the operators' preferred solution into a $1^{st}$ tier priority if the situation fits into the operator's risk preference. For example, the system may identify a situation of a pothole present and the operator has selected to only adjust vehicle speed in the presence of a pothole.

At decision 515, the system may see to identify if any patterns remain. The system will analyze all the data collected at the server (e.g. vehicle path data, vehicle environmental data, and vehicle dynamic data) to identify available patterns at various locations (e.g. intersections, pinpoint locations of data, etc.) that a vehicle may travel along a route. If the patterns do remain, the system may revert back to step 504 and determine the reasoning for the pattern. If no pattern remains, the system will end operation at step 517.

FIG. 6 is a flow chart of the prioritization. The flow chart 600 may be implemented by a processor or controller that is located on a server or at a vehicle. At step 601, the priority pattern may be based on reasoning discussed with respect to both FIG. 4 and FIG. 5. The system may ensure that the priority should still be valid as the system approaches the location to conduct a maneuver/solution.

At decision 603, the system may look to see if any road conditions effect the solution, such as increased traffic volume. The vehicle may utilize cameras or other sensors to identify issues with the road. In another embodiment, the vehicle may receive information or data from another vehicle or remote server identifying an issue. For example, traffic closures or a car accident may be identified at an upcoming location due to traffic data sent from an offboard server.

At step 605, the system may be based on the detected traffic pattern, roadway objects, and current rules adjusted the priority if there are road conditions that affect the solution. As the vehicle travels towards the location, it may utilize other sensors or data to confirm that the maneuver is still appropriate. For example, it may utilize environmental sensors to detect objects around the vehicle to make sure the maneuver is okay to handle.

At step 607, the system may keep the current priority if no road conditions effect the solution. Thus, the system may not alter the priority as set when the vehicle determines that no conditions are present near the location to the maneuver. The maneuver may thus be appropriate if the road has no additional or unforeseen obstacles in the way and execute as appropriate. Thus, the system may execute the original maneuver as planned.

At step 609, the system may output the pattern with reasoning that is sorted based on the priority. Thus, for example, if the current priority for the solution is the same, but an outside hazard is identified that may obstruct the solution, the system may execute the maneuver. But in an alternative embodiment, the system may notify a user of the road condition.

At step 611, the system may view patterns that have their original priority assignment. However, situations may occur near the location that may interfere with a solution to the maneuver. For example, a change in weather or traffic may make a solution that was higher priority invalid. In one embodiment, a lane may be closed that was originally the solution (e.g. travel around a pothole using that lane) to maneuver around a pothole. Outside environmental data (e.g. weather data, traffic data, etc.) or other sensor data (e.g. camera, radar, lidar sensors, etc.) may identify hazards to the solution.

At step 613, the system may approach a location of the solution and determine whether the pattern is still a valid solution. For example, the vehicle may approach the location and be prepared to execute the maneuver. However, other vehicle sensors and data may be processed and scrutinized to determine if the priority is appropriate. However, certain situations may occur that make an upcoming maneuver with the highest priority against current traffic restrictions or perhaps not optimal. For instance, certain street signs may make certain maneuvers illegal at a time of day. Thus, while a maneuver is appropriate for certain times of day, it may be illegal at other periods of time. Or some other external even may have happened (e.g. traffic barrier, accident, etc.)

At step 615, the system may determine that the pattern is an invalid solution and downgrade the priority to a $4^{th}$ tier priority. Thus, while the maneuver may have been a proper maneuver initially, an external factor may have occurred that make the upcoming maneuver a non-viable option. The system will check to determine that the upcoming maneuver is still a valid solution. The system will keep the priority as default if that is the case.

At step 617, the system may determine that the pattern is a valid solution and simply keep the original priority. Thus, the system will check to determine that the upcoming maneuver is still a valid solution. The system will keep the priority as default if that is the case.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system in a host vehicle, comprising:
   a vehicle transceiver located in the host vehicle and configured to receive from a remote server a selectable maneuver in response to data indicative of a driving path of one or more remote vehicles identifying one or more hazards based on historic data;
   a processor in communication with the vehicle transceiver and programmed to output one or more selectable maneuvers responsive to the data indicative of the driving path of one or more remote vehicles in response to the data indicative of the driving path identifying one or more hazards in a vicinity of the host vehicle; and
a display in communication with the processor and configured to display the one or more selectable maneuvers of a same route, wherein the processor is further programmed to send instructions to a vehicle controller to execute one of the one or more selectable maneuvers in response to input from an occupant of the host vehicle.

2. The vehicle system of claim 1, wherein the vehicle transceiver is further configured to send driving path data of the host vehicle.

3. The vehicle system of claim 1, wherein the vicinity of the host vehicle is a threshold radius around the host vehicle.

4. The vehicle system of claim 1, wherein the processor is further programmed to automatically select one of the one or more selectable maneuvers when no input from the occupant has occurred within a threshold time.

5. The vehicle system of claim 1, wherein the vehicle transceiver is configured to send location data of the host vehicle to the remote server.

6. The vehicle system of claim 1, wherein the processor is further configured to out output feedback to the occupant in response to executing the one or one of the one or more selectable maneuvers.

7. The vehicle system of claim 1, wherein the vehicle system includes one or more sensors configured to collect proximity data identifying one or more objects surrounding the host vehicle, and the vehicle transceiver is further configured to send vehicle proximity data to the remote server.

8. The vehicle system of claim 7, wherein the one or more sensors includes a camera, radar sensor, or LiDar sensor.

9. A vehicle system in a host vehicle, comprising:
a vehicle transceiver located in the host vehicle and configured to send location data to a remote server and receive from the remote server two more selectable maneuvers responsive to data indicative of a driving path of one or more remote vehicles identifying one or more hazards based on historic data;
a processor in communication with the vehicle transceiver and programmed to output the two or more selectable maneuvers of a same route in response to the one or more hazards in a vicinity of the host vehicle and send instructions to execute one of the selectable maneuvers at the host vehicle in response to one or more selections conducted by other users in remote vehicles.

10. The vehicle system of claim 9, wherein the vehicle system further includes a display in communication with the processor and configured to display the two or more selectable maneuvers.

11. The vehicle system of claim 9, wherein the processor is further programmed to execute one of the selectable maneuvers at the host vehicle in response to exceeding a threshold time with no user input.

12. The vehicle system of claim 9, wherein the host vehicle is an autonomous vehicle.

13. The vehicle system of claim 9, wherein the two more selectable maneuvers are responsive to environment data collected at the remote server from the one or more remote vehicles identifying one or more hazards.

14. The vehicle system of claim 9, wherein the vehicle system includes one or more sensors configured to collect proximity data identifying objects around the host vehicle and the one or more selectable maneuvers are responsive to the proximity data.

15. The vehicle system of claim 14, wherein the one or more sensors includes a camera, radar sensor, or LiDar sensor.

16. The vehicle system of claim 14, wherein the vehicle transceiver is further configured to send proximity data to the remote server.

17. A server, comprising:
a transceiver configured to communicate with one or more remote vehicles and receive data indicative of a driving path of the one or more remote vehicles;
a controller in communication with the transceiver and configured to:
1) determine one or more hazards utilizing at least the data indicative of the driving path of the one or more remote vehicles and historic data;
2) identify two or more vehicle maneuvers in response to the one or more hazards, wherein the two or more vehicle maneuvers are identified utilizing at least the data indicative of the driving path of the one or more remote vehicles; and
3) in response to input from an occupant of the host vehicle, send information regarding the two or more selectable maneuvers via the transceiver to a host vehicle, wherein the information includes driving instructions for the two or more selectable maneuvers.

18. The server of claim 17, wherein the transceiver is further configured to receive vehicle dynamic data from one or more remote vehicles and the controller is further configured to determine the one or more hazards utilizing at least the vehicle dynamic data.

19. The server of claim 17, wherein the transceiver is further configured to receive vehicle environment data from one or more remote vehicles and the controller is further configured to determine the one or more hazards utilizing at least the vehicle environment data.

* * * * *